US009697125B2

(12) United States Patent
Chung et al.

(10) Patent No.: US 9,697,125 B2
(45) Date of Patent: Jul. 4, 2017

(54) MEMORY ACCESS MONITOR

(71) Applicant: Advanced Micro Devices, Inc., Sunnyvale, CA (US)

(72) Inventors: Jaewoong Chung, Sunnyvale, CA (US); Shekhar Srikantaiah, State College, PA (US); Lisa Hsu, Kirkland, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/682,757

(22) Filed: Apr. 9, 2015

(65) Prior Publication Data
US 2015/0317249 A1 Nov. 5, 2015

Related U.S. Application Data

(62) Division of application No. 13/177,092, filed on Jul. 6, 2011, now Pat. No. 9,032,156.

(51) Int. Cl.
| | |
|---|---|
| *G06F 12/00* | (2006.01) |
| *G06F 12/084* | (2016.01) |
| *G06F 12/0842* | (2016.01) |
| *G06F 12/126* | (2016.01) |
| *G06F 12/123* | (2016.01) |

(52) U.S. Cl.
CPC ........ *G06F 12/084* (2013.01); *G06F 12/0842* (2013.01); *G06F 12/126* (2013.01); *G06F 12/123* (2013.01); *G06F 2212/1024* (2013.01); *G06F 2212/152* (2013.01); *G06F 2212/251* (2013.01); *G06F 2212/62* (2013.01)

(58) Field of Classification Search
CPC ... G06F 12/084; G06F 12/0842; G06F 12/121
See application file for complete search history.

(56) References Cited

U.S. PATENT DOCUMENTS

| | | | | |
|---|---|---|---|---|
| 2011/0138129 A1* | 6/2011 | Krishna | ............... | G06F 12/0842 711/133 |
| 2011/0246995 A1* | 10/2011 | Fedorova | ............... | G06F 9/5033 718/103 |
| 2012/0059983 A1* | 3/2012 | Nellans | ............... | G06F 12/0215 711/105 |

OTHER PUBLICATIONS

Gill et al., "STOW: A Spatially and Temporarily Optimized Write Caching Algorithm", USENIX'09 Proceedings of the 2009 conference on USENIX Annual technical conference,sec. 1-6.4( p. 1-14), IBM Almaden.*

* cited by examiner

*Primary Examiner* — David X Yi
*Assistant Examiner* — Arvind Talukdar

(57) ABSTRACT

For each access request received at a shared cache of the data processing device, a memory access pattern (MAP) monitor predicts which of the memory banks, and corresponding row buffers, would be accessed by the access request if the requesting thread were the only thread executing at the data processing device. By recording predicted accesses over time for a number of access requests, the MAP monitor develops a pattern of predicted memory accesses by executing threads. The pattern can be employed to assign resources at the shared cache, thereby managing memory more efficiently.

12 Claims, 5 Drawing Sheets

| Thread ID | Bank 0 | Bank 1 | Bank 2 | Row Buffer Hits | Accesses |
|---|---|---|---|---|---|
| 0 | | | | | |
| 1 | 1 | 3 | | 1 | 4 |
| 2 | 2 | 1 | 2 | 2 | 5 |
| 3 | | | | | |
| 4 | | | | | |
| 5 | | | | | |
| 6 | | | | | |

FIG. 3

MEMORY ACCESS MONITOR

CROSS REFERENCE TO RELATED APPLICATIONS

This application is a divisional of U.S. patent application Ser. No. 13/177,092, filed on Jul. 6, 2011, which is incorporated by reference herein in its entirety.

BACKGROUND

Field of the Disclosure

The present disclosure generally relates to data processing devices, and more particularly to memory access management for data processing devices.

Description of Related Art

Data processing devices typically employ a memory hierarchy to store information, whereby the lowest level the hierarchy represents system memory and the higher levels in the hierarchy each represent a cache. Typically, higher levels in the hierarchy are represented by faster memory devices that can store smaller amounts of data than the slower memory devices lower in the hierarchy. Many data processing devices improve efficiency by moving information recently accessed by a processor core up the memory hierarchy. As recently accessed information is moved into a hierarchy level, less recently used information is typically evicted from the level in order to make room for the recently accessed information. The information to be evicted is determined according to an eviction procedure. However, conventional eviction procedures can be inefficient in multi-core data processing devices whereby different cores share levels in the memory hierarchy.

BRIEF DESCRIPTION OF THE DRAWINGS

The present disclosure may be better understood, and its numerous features and advantages made apparent to those skilled in the art by referencing the accompanying drawings.

Figure 3:
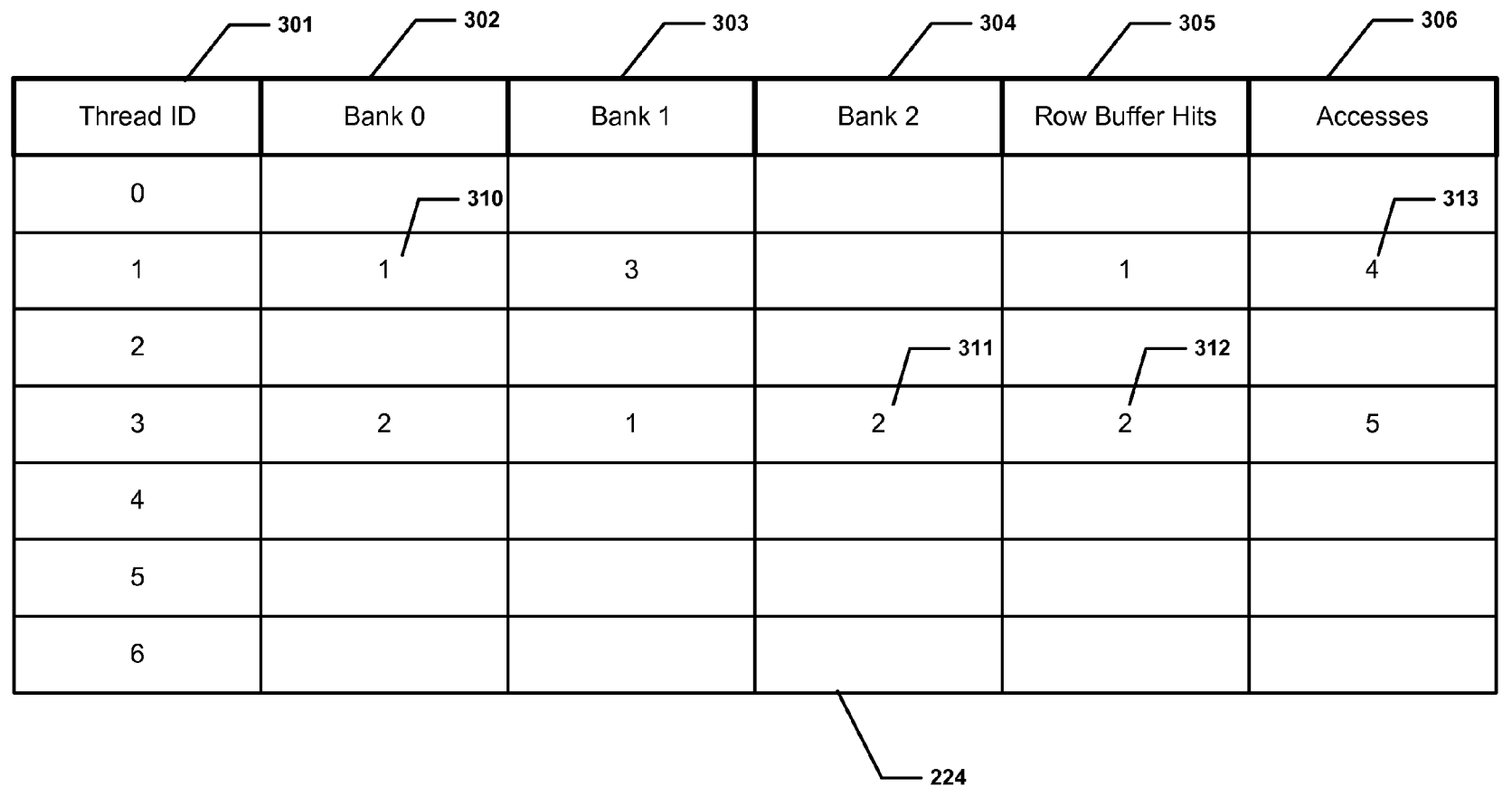

FIG. 3 is a diagram of the access pattern table of FIG. 2 in accordance with one embodiment of the present disclosure.

The use of the same reference symbols in different drawings indicates similar or identical items.

DETAILED DESCRIPTION OF THE DRAWINGS

FIGS. 1-5 illustrate devices and techniques to monitor memory access patterns of a data processing device. In particular, for each access request received at a shared cache of the data processing device, a memory access pattern (MAP) monitor predicts which of the memory banks of a memory, and which corresponding row buffers, would be accessed by the access request if the requesting thread were the only thread executing at the data processing device. By recording predicted accesses over time for a number of access requests, the MAP monitor develops a pattern of predicted memory accesses by executing threads. The pattern can be employed to assign resources at the shared cache, thereby managing memory more efficiently.

To illustrate, if the pattern of predicted memory accesses indicates a thread is characterized by relatively high temporal locality, such that the thread tends to request access to the same memory locations repeatedly, the thread is likely to execute more efficiently if the thread's access requests are satisfied at the shared cache (or higher in the memory hierarchy). In contrast, if the pattern of predicted memory accesses indicates a thread is characterized by relatively high spatial locality, such that the thread tends to request access to different memory locations located relatively close together in memory, the thread is likely to execute just as efficiently (or suffer a relatively small performance degradation) if the thread's access requests are satisfied at a row buffer of a memory bank. Accordingly, in one embodiment the shared cache of a data processing device is configured to implement a cache line replacement procedure such that cache lines associated with threads having higher spatial locality are more likely to be replaced than cache lines associated with threads having higher temporal locality. The threads having higher temporal locality are thereby executed more efficiently, while the threads having higher spatial locality suffer relatively small performance degradation, such that the overall efficiency of the data processing device is enhanced.

Figure 1:
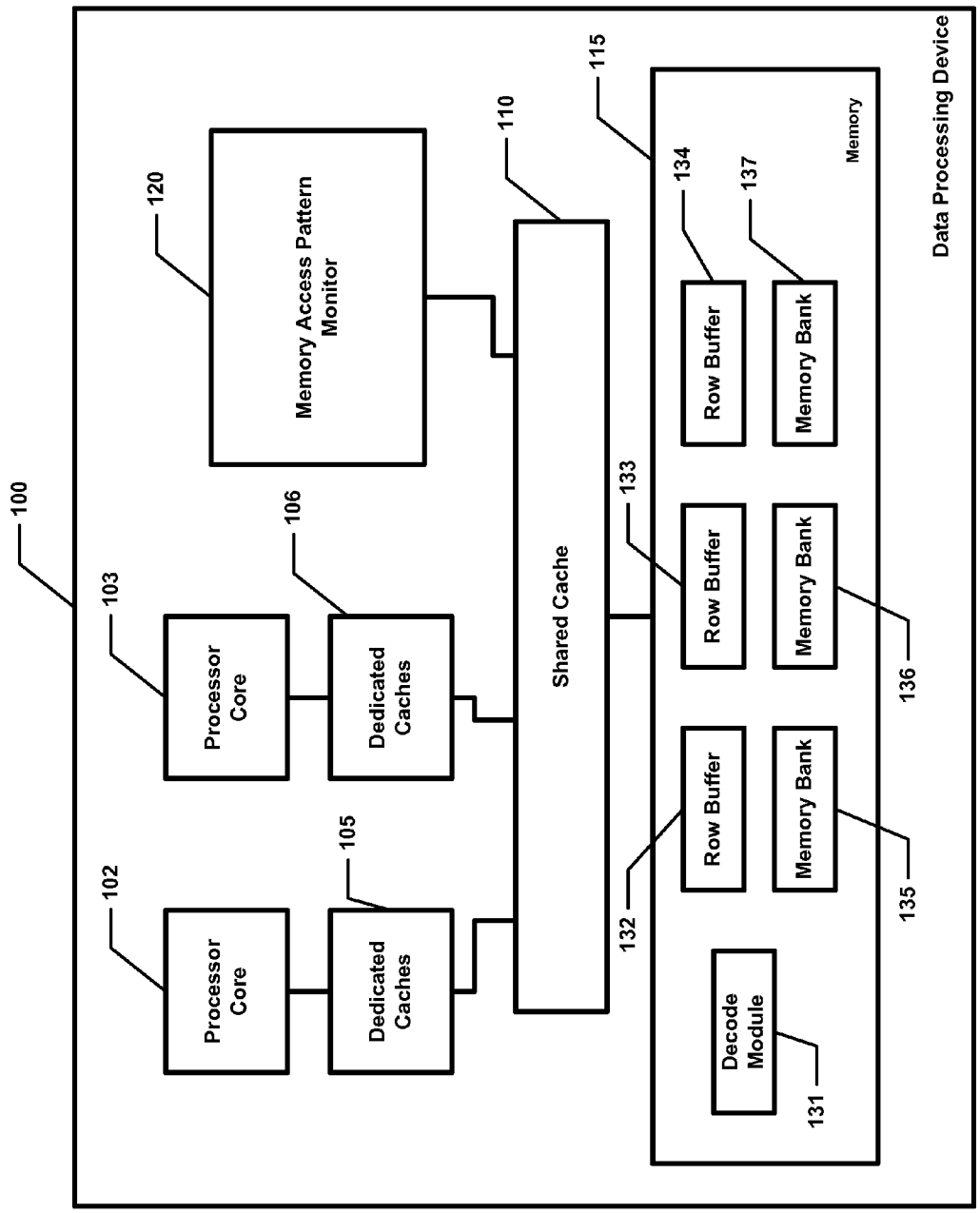
FIG. 1 is block diagram illustrating a data processing device in accordance with a specific embodiment of the present disclosure.

FIG. 1 illustrates a block diagram of a data processing device 100 in accordance with one embodiment of the present disclosure. The data processing device 100 is a general purpose or application specific processor device that executes instructions in order to perform designated tasks. Accordingly, the data processing device 100 can be incorporated into a wide variety of devices and systems, such as computer devices, handheld devices such as mobile phones, server systems, automobiles, consumer electronic devices, and the like. To execute instructions, the data processing device 100 employs a number of modules to manipulate information. For example, in the illustrated embodiment, data processing device 100 includes modules such as processor cores (e.g. processor cores 102 and 103), caches (e.g. dedicated caches 105 and 106 and shared cache 110), memory (e.g. memory 115), and memory access pattern (MAP) monitor 120. Data processing device 100 may also include additional modules (not shown), such as non-volatile memory devices, input/output controllers, communication interfaces, and the like, each employed by the data processing device to carry out operations requested by the executing instructions.

Turning to the illustrated modules, each of the processor cores 102 and 103 includes an instruction pipeline (not shown) configured to execute instructions. In particular, each of the processor cores 102 and 103 is configured to receive instructions associated with a different thread of a multi-threaded application, or different threads of different applications, and to perform operations as indicated by the corresponding thread instructions. Further, each of the processor cores 102 and 103 is configured to execute instructions of a designated thread concurrently with execution of a thread at the other processor core, thereby providing thread-level parallelism for a multi-threaded application. It will be appreciated that although two processor cores are illustrated in FIG. 1, the techniques described herein are applicable to data processing devices having more than two processor cores.

The dedicated caches 105 and 106 each represent a set of caches, whereby each cache in the set is associated with a particular cache level in the memory hierarchy of data processing device 100. For example, each of the dedicated caches 105 and 106 can include a level 1 (L1) cache and a level 2 (L2) cache. The dedicated caches 105 and 106 are arranged as dedicated caches for their associated processor cores, such that a processor core can directly access only its dedicated cache. Directly access means that the processor core can access the dedicated cache with a request that does not proceed through an intervening module or device, such as a system memory controller or other processor core. In an embodiment, a processor core can access data stored in the dedicated cache of another core, but the access to the dedicated cache of the other core must proceed through another module, such as a system memory controller or another processor core.

Shared cache 110 is a cache that is associated with a lower level in the memory hierarchy than the dedicated caches 105 and 106. Thus, for example, in one embodiment the shared cache 110 is configured as a level 3 (L3) cache. In addition, the shared cache 110 is configured as a shared cache, such that it can directly satisfy access requests that originated at either of the processor cores 102 and 103. It will be appreciated that the techniques described herein are applicable to cache configurations other than the example configuration illustrated at FIG. 1.

The memory 115 includes one or more memory modules to store information for the data processing device 100. In the embodiment of FIG. 1, the memory 115 is random access memory configured to be system memory, so that the memory 115 is located at a higher level of the memory hierarchy than any cache of the data processing device 100. The memory 115 includes a set of memory banks (e.g. memory banks 135-137), a set of row buffers (e.g. row buffers 132-134), and a decode module 131. Operation of these modules can be understood with reference to the handling of an access request by the data processing device 100.

In particular, in the course of executing threads, the processor cores 102 and 103 will generate access requests, such as read and write requests. Each access request includes an address indicating the location of the information associated with the request. The access requests are first provided to the lowest level of the memory hierarchy for the processor core that generated the request. If the access request cannot be satisfied at a particular level of the memory hierarchy, it is passed to the next higher level, and so on until the access request is satisfied. As used herein an access request is satisfied by a hierarchy level if the hierarchy level is able to respond to the access request without passing the request to a higher level in the memory hierarchy. Thus, a cache at a particular level of the memory hierarchy is able to satisfy an access request if it stores the information associated with the address indicated by the access request.

For example, an access request generated by the processor core 102 is first provided to the L1 cache of the dedicated caches 105. If the L1 cache is unable to satisfy the access request, it provides the request to the L2 cache. In the event that the L2 cache cannot satisfy the access request, it in turn provides the request to the shared cache 110. In the event that none of the caches can satisfy the access request, the shared cache 110 provides the request to the memory 115.

In response, the memory 115 employs the decode module to decode the address associated with the request. Based on the decoded address, the memory 115 selects one of the memory banks 135-137. Each of the memory banks 135-137 is associated with a corresponding one of the row buffers 132-134. The row buffers 132-134 are configured to store information equivalent to one row of one of the memory banks 135-137. Further, each decoded address is associated with a row of the memory bank indicated by the decoded address. Accordingly, in response to an access request, the memory 115 first determines if the row associated with the decoded address is stored at one of the row buffers 132-134. If so, a row buffer hit has occurred. In response to a row buffer hit, the memory 115 retrieves the portion of the row indicated by the decoded address from the indicated row buffer and provides the retrieved portion to the shared cache 110. If the row is not located at one of the row buffers 132-134, the memory 115 retrieves the row from the memory bank indicated by the decoded memory address, copies the row to the row buffer associated with the memory bank, and provides the portion of the row indicated by the decoded address to the shared cache 110.

The MAP monitor 120 is configured to monitor access requests provided to the shared cache 110 and, based on those requests, store a predicted pattern of accesses to the memory 115. As used herein, a predicted pattern of accesses refers to a pattern of memory accesses that are predicted to occur if a different set of threads were executing than the set of threads that is actually executing at the processor cores of a data processing device, or if the set of threads that are executing at the processor cores were to access the memory hierarchy in a different way. For example, in one embodiment, the MAP monitor 120 determines, for each executing thread, the pattern of accesses to the memory 115 that would occur if the thread were the only thread being executed at the data processing device 100 and if the thread were not accessing the shared cache 110. Thus, if a thread designated Thread 1 is executing at processor core 102 concurrently with the execution of a thread, designated Thread 2, at processor core 103, the MAP monitor 120 would determine and store the pattern of memory accesses predicted to occur if Thread 1 were the only thread executing and was not accessing the shared cache 110, and would also store a predicted pattern of memory accesses the pattern of memory accesses predicted to occur if Thread 2 were the only thread executing and not accessing the shared cache 110.

Figure 2:
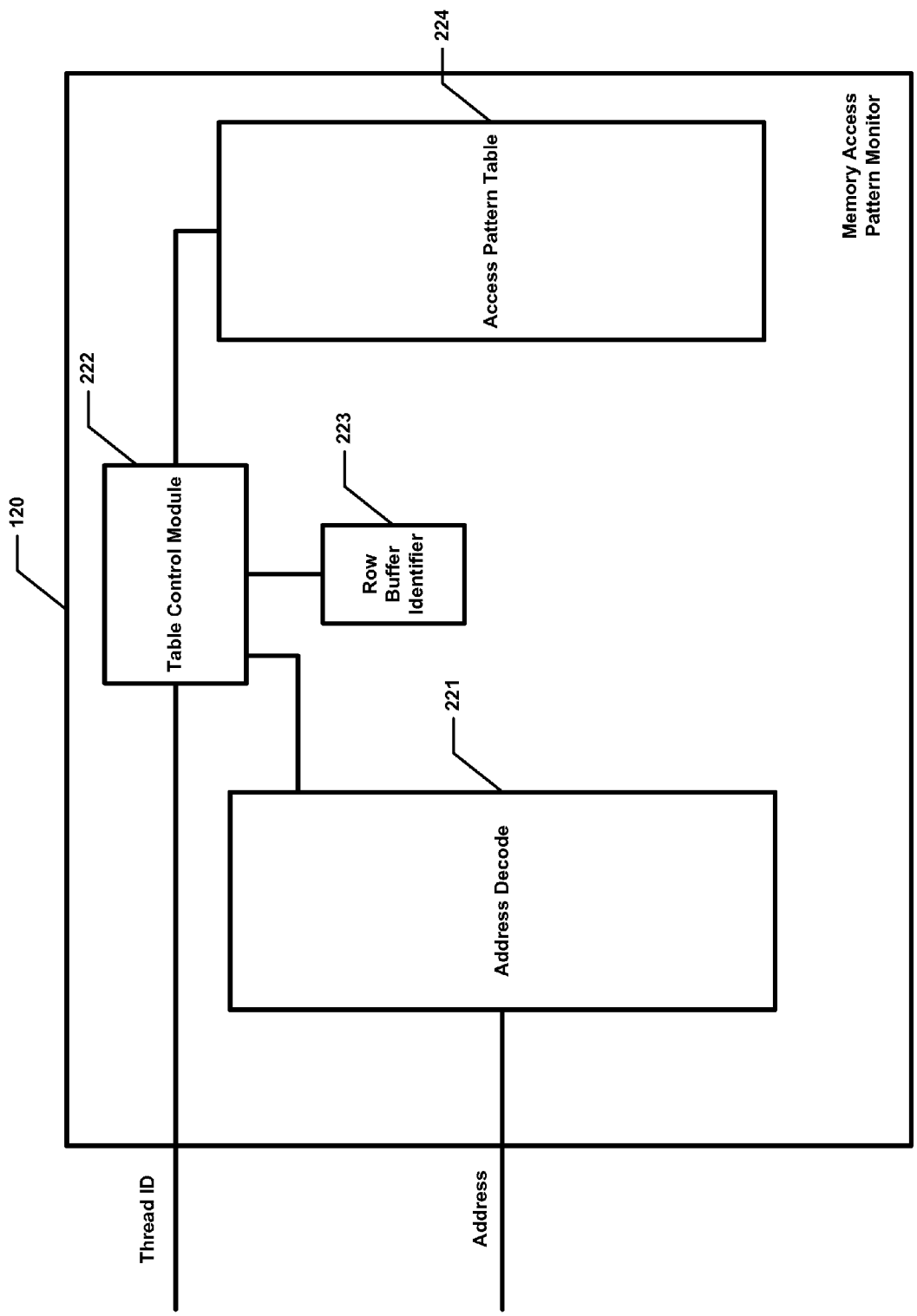
FIG. 2 is a block diagram of the memory access pattern monitor of FIG. 1 in accordance with one embodiment of the present disclosure.
Figure 4:
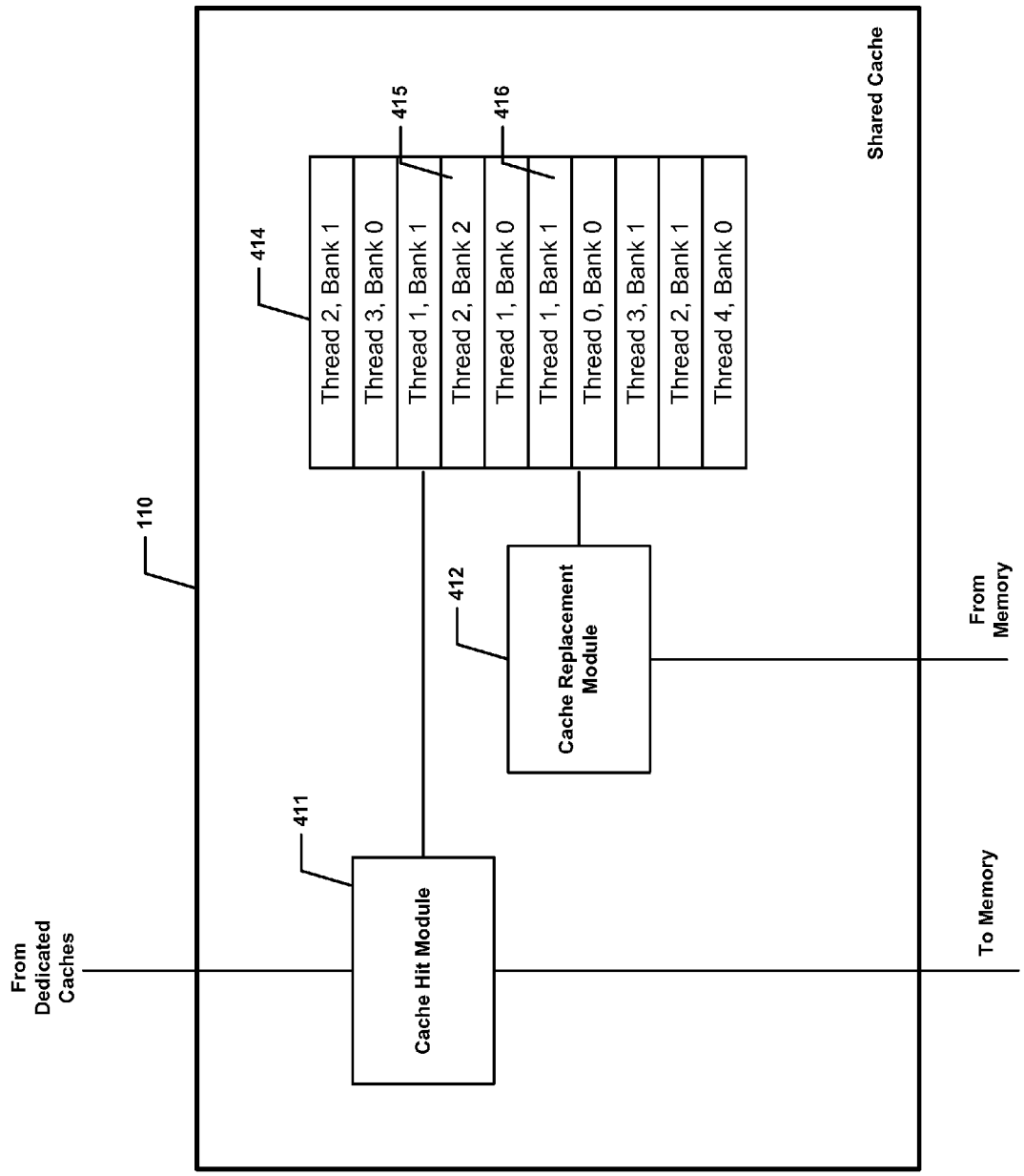
FIG. 4 is a block diagram of the shared cache of FIG. 1 in accordance with one embodiment of the present disclosure.

A particular embodiment of the MAP monitor 120 is illustrated at FIG. 2. In the illustrated embodiment, the MAP monitor 120 includes an address decode module 221, a table control module 222, a row buffer identifier 223, and an access pattern table 224. The address decode module 221 includes an input to receive an address and an output connected to the table control module 222. The table control module 222 includes an input to receive thread identification information, and further includes connections to the row buffer identifier 223 and the access pattern table 224.

The MAP monitor 120 is configured to receive, from the shared cache 110, address information and thread identification information for each access request provided to the cache 110. In an embodiment, the address and thread identification information are provided in parallel to their provision to the shared cache 110 to provide for more efficient processing of each access request. The address decode module 221 is configured to decode the provided address information to determine decoded address information. In an embodiment, the address decode module 221 is configured to decode the address information in a substantially similar manner to the decode module 131 of the memory 115. Thus, the address decode module 221 produces similar information as would be provided by the decode module 131 if the memory access were provided to the memory 115. For example, the decode module 131 may be configured to perform bit swizzling, masking, and other bit processing techniques on a received address. The address decode module 131 is configured to perform the same bit swizzling, masking, and other bit processing techniques. Further, in one embodiment the address decode module 221 is configurable, such that the particular decoding technique implemented by the module can be adjusted to match that of the decode module 131. In an embodiment, the data processing device 100 is configured to, during device initialization, to determine configuration information, such as the number of memory banks and read buffers at the memory 115 and the particular decoding technique implemented at the decode module 131. Based on the configuration information, the data processing device 100 can configure the address decode module 221 to implement the same decoding technique as implemented at the decode module 131. The data processing device 100 can determine the configuration information by polling the memory 115, by extracting the information from BIOS information, and the like.

The table control module 222 is configured to determine, based on the decoded address information both the memory bank and the associated row of the memory bank that would be selected by the memory 115 to satisfy the access request. The table control module stores an indicator of the selected row at the row buffer identifier 223. Thus, the row buffer identifier 223 stores, for each executing thread, an indicator of the row that would be stored at each of the row buffers 132-134 if the thread were the only thread being executed at the data processing device 100. This can be illustrated by an example, whereby a particular access request received at the shared cache 110 would be satisfied, if the access request were provided to the memory 115, by row 10 of memory bank 135. Thus, if the access request were provided to the memory 115, row 10 of memory bank 135 would be copied to the row buffer 132. Accordingly, in response to the access request, the table control module stores an indicator of row 10 at memory bank 135 at the row buffer identifier 223 for the thread that provided the access request. If a subsequent access request for the thread and received at the shared cache 110 would result, if the access request were provided to the memory 115, in row 15 of the memory bank 135 being copied to the row buffer 132, the indicator of row 10 of memory bank 135 is replaced by an indicator of row 15 of memory bank 135 at row buffer identifier 223. Thus, for each executing thread and for each of the row buffers 132-134, the row buffer identifier 223 indicates the row of the associated memory bank that would be currently stored at each row buffer if the thread were the only thread being executed. Accordingly, because other threads are being executed, and the indicators stored at the row buffer identifier 223 may indicate different rows of the memory banks 135-137 than are actually stored at the row buffers 132-134 at any particular point in time.

The table control module 222 provides thread identification information, the memory bank and row buffer information indicated by the decoded address information, and other information to the access pattern table 224 for storage at designated storage locations. This can be better understood with reference to FIG. 3, which illustrates a particular embodiment of the access pattern table 224. In the illustrated embodiment each row of the access pattern table 224 is associated with a different executing thread, as indicated by column 301. Columns 302-304 indicate, for each memory bank, the number of times a particular thread has accessed the memory bank associated with the column. A blank in the table indicates a zero value. Thus, location 310 indicates that Thread 1 has accessed the memory bank designated Bank 0 one time, while location 311 indicates that Thread 3 has accessed Bank 2 two times.

Column 305 indicates the number of row buffer hits that would have occurred for a particular thread if that thread were the only thread executing at data processing device 100. To determine a row buffer hit, the table control module 222 determines the row of a memory bank that would be accessed by a received access request and compares the determined row to the row indicated at the row buffer identifier 223. If the rows match, this indicates that, if the thread that provided the access request were the only thread being executed, the access request could likely be satisfied by a row buffer. In response, the table control module 222 increments that row buffer hits location for that thread. Thus, location 312 indicates that, if Thread 3 were the only thread being executed at the data processing device 100, it is predicted that two row buffer hits would have occurred at the memory 115.

The accesses column 306 indicates the number of times that an access request is predicted to be provided to the memory 115 for the associated thread if the thread were the only thread being executed at the data processing device 100. Thus, location 313 indicates that Thread 1 is predicted to access the memory 115 4 times if Thread 1 were the only thread executing at the data processing device 100.

The access pattern table 224 stores a predicted pattern of memory accesses for each thread, if each thread were the only thread being executed at the data processing device 100. Accordingly, if more than one thread is being executed, the information stored at the access pattern table 224 will differ from the actual pattern of memory accesses for each thread. Thus, for example, a particular thread, executing concurrently with other threads, can have more or fewer actual row buffer hits, memory accesses, and the like than are indicated by the access pattern table 224.

The information stored at the access pattern table 224 can be reset to an initial value, either periodically or in response to one or more events. For example, in one embodiment the values stored at each location of the access pattern table 224 are reset to zero at designated intervals of time. In another embodiment, the values are reset for a particular thread when one of the values for the thread reaches a threshold amount.

The information stored at the access pattern table 224 can be employed by the data processing device 100 to adjust memory management techniques. For example, the ratio between the number of row buffer hits for a thread (as indicated by column 305) and the number of memory accesses by the thread (as indicated by column 306) indicates the row buffer locality for the thread. As used herein, the row buffer locality refers to the predicted likelihood that an access request for a thread, if the thread were the only thread executing at a data processing device, would result in a row buffer hit, if the access request were provided to memory. Based on the row buffer locality, the data processing device 100 can adjust how resources of the memory hierarchy are assigned to each executing thread. This can be better understood with reference to FIG. 4, which illustrates a particular embodiment of the shared cache 110 of FIG. 1.

In the illustrated embodiment, the shared cache 110 includes a cache hit module 411, a cache replacement module 412, and a storage array 414. The storage array 414 includes a number of storage locations, referred to as cache lines. Each cache line stores information in response to an access request of a designated thread, with the information retrieved from a particular bank. Thus, in the illustrated example of FIG. 4, cache line 415 stores information retrieved from memory bank Bank 2 in response to a request from Thread 2.

Cache hit module 411 receives access requests from the dedicated caches 105 and 106 that could not be satisfied at those caches. Cache hit module 411 decodes each received access request and determines if it can be satisfied by any of the cache lines at storage array 414. If so, the shared cache 110 satisfies the access request, either (in the case of a read request) by providing the stored information indicated by the request or (in the case of a write request) modifying the cache line indicated by the access request. If the access request cannot be satisfied, the cache hit module 411 provides the access request to the memory 115 to be satisfied.

In response to the memory 115 satisfying an access request, information stored at the memory location indicated by the request is provided to the cache replacement module 412 for storage at the storage array 414. In response, cache replacement module 412 determines if there are any free cache lines at the storage array 414. If so, cache replacement module 412 stores the received information at one of the free cache lines. If there are no free cache lines available, the cache replacement module 412 selects one of the cache lines for replacement, and replaces the information stored at the selected cache line with the information received from the memory 115. The cache hit module 411 also provides the received information to one of the dedicated caches 105 and 106 to respond to the access request.

In an embodiment, the cache replacement module 412 employs the access pattern table 224 to select a cache line for replacement. For example, the access pattern table 224 indicates the number of row buffer hits predicted for each thread and the number of memory accesses predicted for each thread. A thread having a relatively high row buffer hits to accesses ratio is likely to suffer a relatively smaller performance penalty in accessing the memory 115 than a thread having a relatively lower ratio. Accordingly, in one embodiment the cache replacement module 412 determines, based on the access pattern table 224, the predicted ratio of row buffer hits to memory accesses for each executing thread and prioritizes cache lines for replacement based on the determined ratios. In particular, the cache replacement module 412 can select cache lines associated with higher-ratio threads for replacement before selecting cache lines associated with lower-ratio threads. Thus, for example, if cache replacement module 412 determines that Thread 2 has a higher predicted row buffer hits to accesses ratio than the ratio for Thread 1, cache replacement module 412 can select cache line 415 for replacement over selecting cache line 416. In this fashion, threads which are likely to suffer a greater performance penalty for accesses to the memory 115 are assigned more resources of the shared cache 110, thereby improving efficiency.

In another embodiment, the cache replacement module 412 can prioritize cache lines for replacement on both a per-thread and per bank basis. In this embodiment, the cache replacement module 412 monitors the accesses to each memory bank by each thread, as indicated by the access pattern table 224. In response to the number of accesses to a particular bank by a particular thread exceeding a threshold amount, the cache replacement module 412 can prioritize cache lines associated with that thread and that memory bank for replacement.

Figure 5:
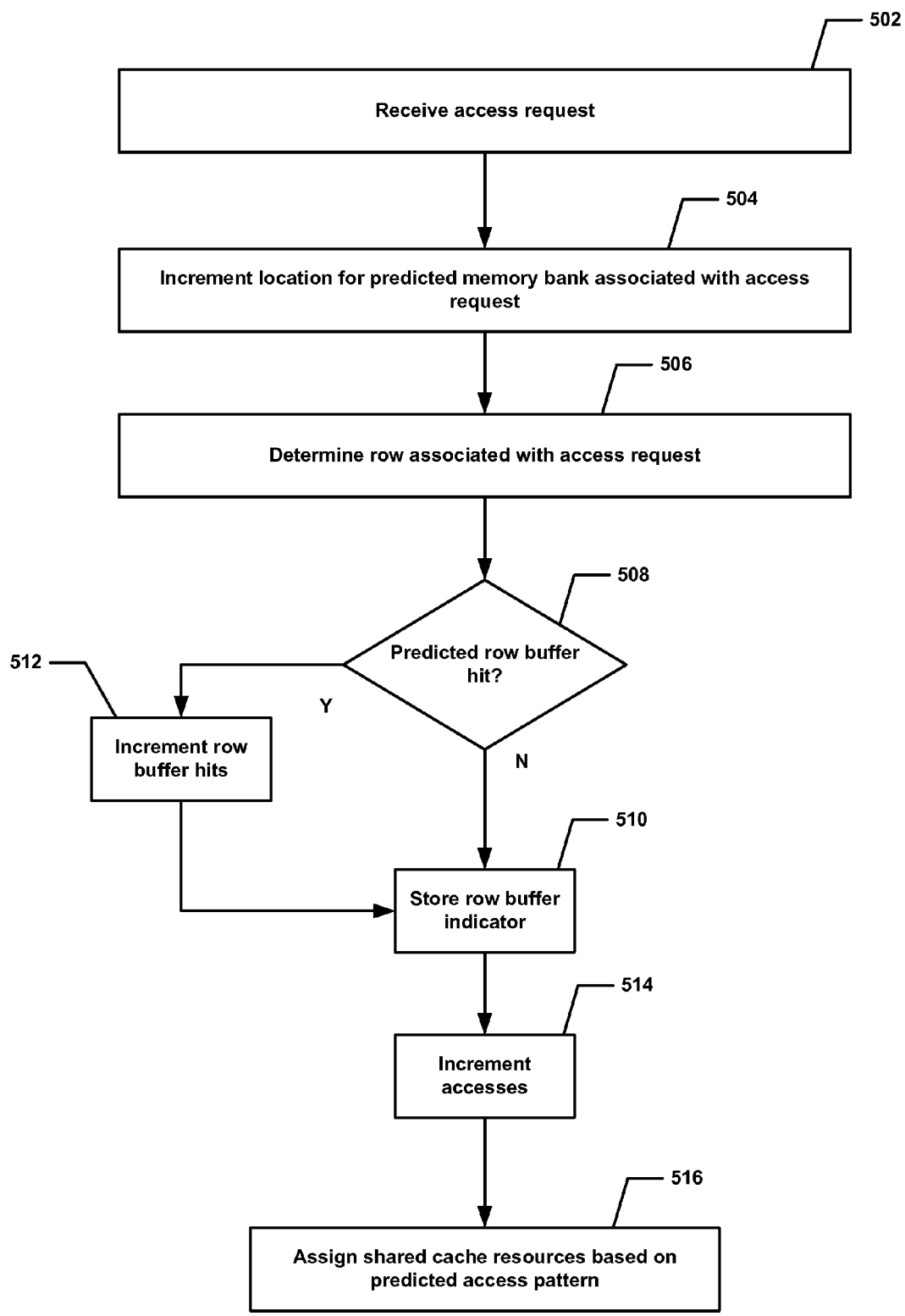
FIG. 5 is a flow diagram of a method of monitoring memory accesses in accordance with one embodiment of the present disclosure.

FIG. 5 illustrates a method of monitoring access requests at the memory 115 in accordance with one embodiment of the present disclosure. At block 502, an access request is received at the shared cache 110. In response, the shared cache 110 provides address information and thread identification information associated with the access request. At block 504, the address decode module 221 decodes the address information to determine a predicted memory bank that would be accessed by the access request if the thread associated with the access request were the only thread executing at the data processing device 100. In response, the table control module 222 increments the value stored at the location of the access pattern table 224 corresponding to the thread and the predicted memory bank.

At block 506, the address decode module 221 determines the row of the memory bank that would be accessed by the access request if the thread associated with the access request were the only thread executing at the data processing device 100. In response, at block 508, the table control module 222 compares the determined row with the row indicator for the thread stored at row buffer identifier 223. If the rows do not match, the method flow proceeds to block 510 and the determined row is stored at the row buffer indicator 510. If the rows match, a predicted row buffer hit is indicated and the method flow moves to block 512 where the table control module 222 increments the value stored at the row buffer hits column of the access pattern table 224 at the row corresponding to the thread indicated by the thread identification information. The method flow proceeds to block 510.

From block 510, the method flow proceeds to block 514 and the table control module 222 increments the value stored at the accesses column at the row of the access pattern table 224 corresponding to the thread indicated by the thread identification information. The method flow proceeds to block 516 and the shared cache 110 assigns resources of the cache based on the predicted access pattern indicated by the access pattern table 224.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. At a data processing device comprising a plurality of processor cores, a shared cache, and a memory including a plurality of memory banks and a plurality of row buffers, each of the plurality of row buffers associated with a corresponding one of the plurality of memory banks, a method comprising:

replacing cache lines at the shared cache, such that a subset of the cache lines associated with threads having a spatial locality higher than a first threshold, wherein the spatial locality is a predicted likelihood that an access request for a thread, if the thread were the only thread executing at a data processing device, would result in a row buffer hit, if the access request were provided to memory, are assigned a higher replacement priority than a subset of the cache lines associated with threads having a temporal locality higher than a second threshold, wherein the temporal locality is a predicted likelihood that an access request for a thread, if the thread were the only thread executing at the data processing device, would result in a cache hit at the shared cache, if the access request were provided to memory, and wherein replacing cache lines comprises storing data at the cache lines.

2. The method of claim 1, wherein replacing cache lines further comprises: determining and storing, at the shared cache, data representative of a predicted pattern of accesses to the plurality of memory banks by a thread based on an access request from the thread.

3. The method of claim 2, wherein replacing cache lines further comprises prioritizing replacement of selected locations of the shared cache based on the predicted pattern of accesses.

4. The method of claim 2, wherein storing the data representative of the predicted pattern of accesses comprises storing an indicator of a first memory bank of the plurality of memory banks.

5. The method of claim 4, wherein storing the indicator of the first memory bank comprises storing the indicator in response to predicting the first memory bank would be accessed by the access request if the access request were not processed at the shared cache.

6. The method of claim 2, wherein storing the data representative of the predicted pattern of accesses comprises modifying a stored table, and further comprises configuring the stored table in response to detecting the plurality of memory banks.

7. The method of claim 2, further comprising: satisfying the access request at the shared cache.

8. A data processing device, comprising:
a plurality of processor cores;
a shared cache coupled to each of the plurality of processor cores, the shared cache to receive a plurality of access requests from the plurality of processor cores;
a memory comprising a plurality of memory banks and a plurality of row buffers, each of the plurality of row buffers associated with a corresponding one of the plurality of memory banks;
a storage location to store, based on the plurality of access requests, data representative of a predicted pattern of accesses to the plurality of memory banks; and
a cache controller to replace cache lines at the shared cache, such that a subset of the cache lines associated with threads having a spatial locality higher than a first threshold, wherein the spatial locality is a predicted likelihood that an access request for a thread, if the thread were the only thread executing at the data processing device, would result in a row buffer hit, if the access request were provided to memory, are assigned a higher replacement priority than a subset of the cache lines associated with threads having a temporal locality higher than a second threshold, wherein the temporal locality is a predicted likelihood that an access request for a thread, if the thread were the only thread executing at the data processing device, would result in a cache hit at the shared cache, if the access request were provided to memory, and wherein replacing comprises storing data at the cache lines.

9. The data processing device of claim 8 wherein the cache controller is to replace cache lines by determining and storing, at the shared cache, data representative of a predicted pattern of accesses to the plurality of memory banks by a thread based on an access request from the thread.

10. The data processing device of claim 9, wherein storing the data representative of the predicted pattern of accesses comprises storing an indicator of a first memory bank of the plurality of memory banks.

11. The data processing device of claim 10, wherein storing the indicator of the first memory bank comprises storing the indicator in response to predicting the first memory bank would be accessed by the access request if the access request were not processed at the shared cache.

12. The data processing device of claim 9, wherein storing the data representative of the predicted pattern of accesses comprises modifying a stored table, and further comprises configuring the stored table in response to detecting the plurality of memory banks.

* * * * *